Sept. 10, 1935.  F. MELZER ET AL  2,013,694
MEANS FOR DELIVERING MEASURED QUANTITIES OF LIQUID FROM A RECEPTACLE
Filed July 20, 1933  2 Sheets-Sheet 1
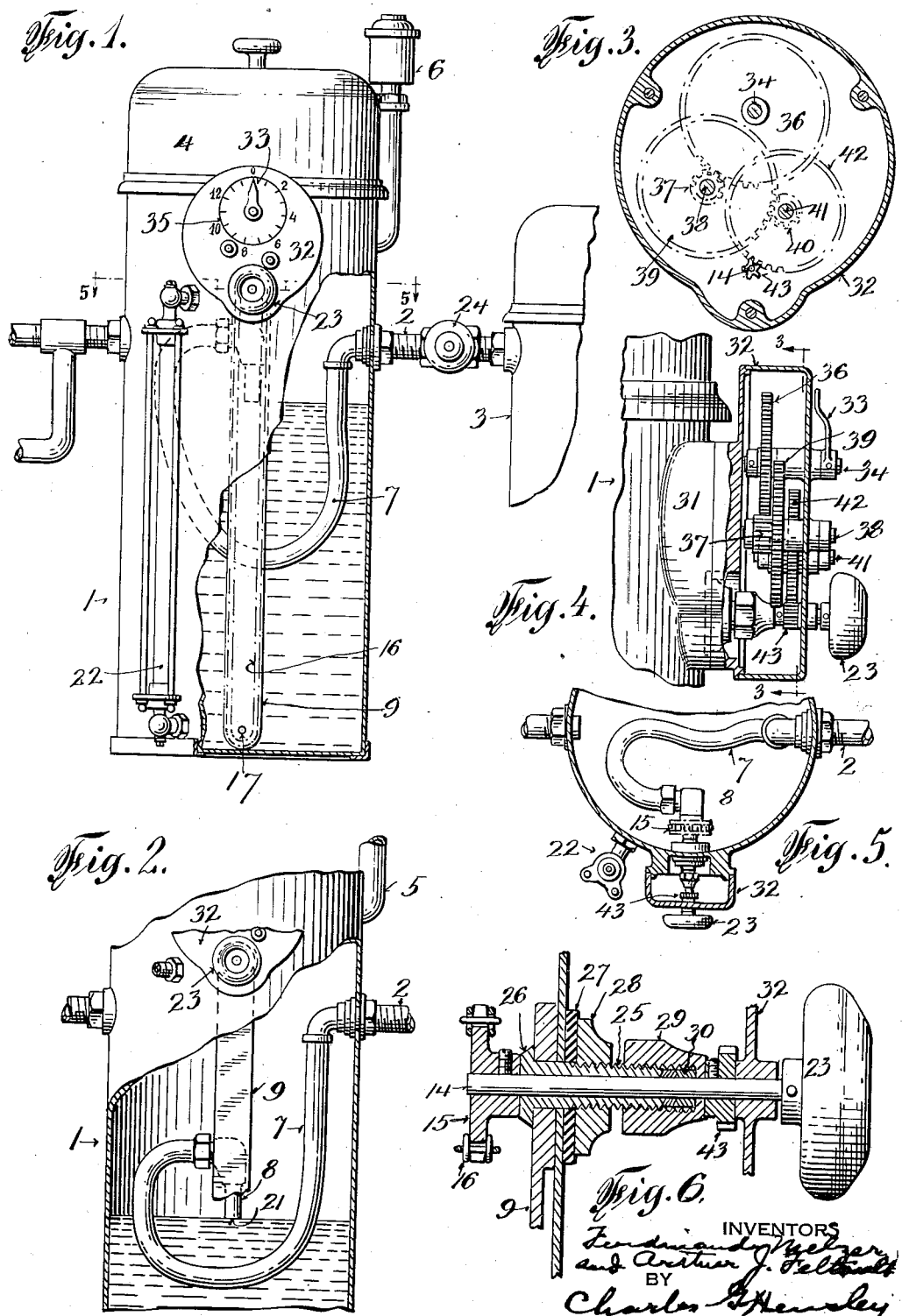

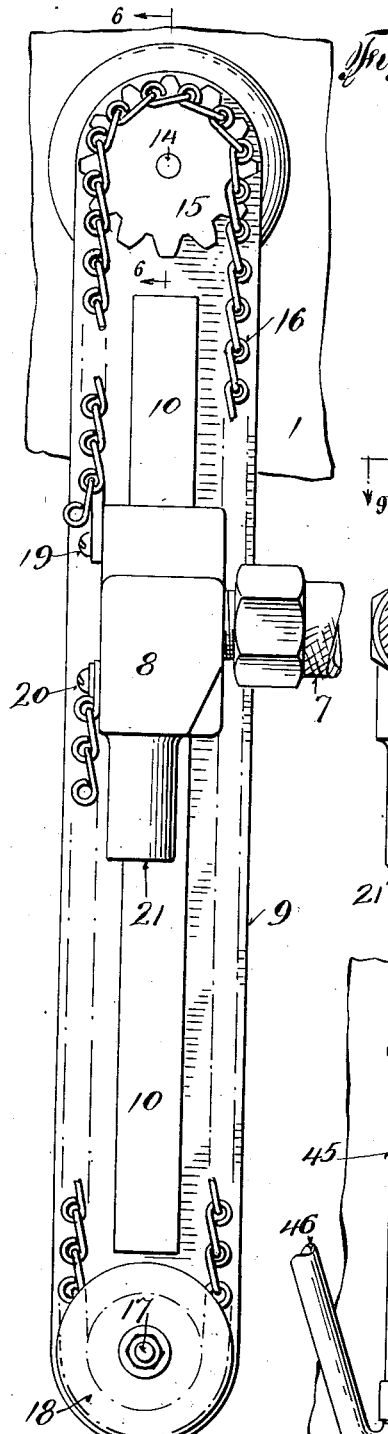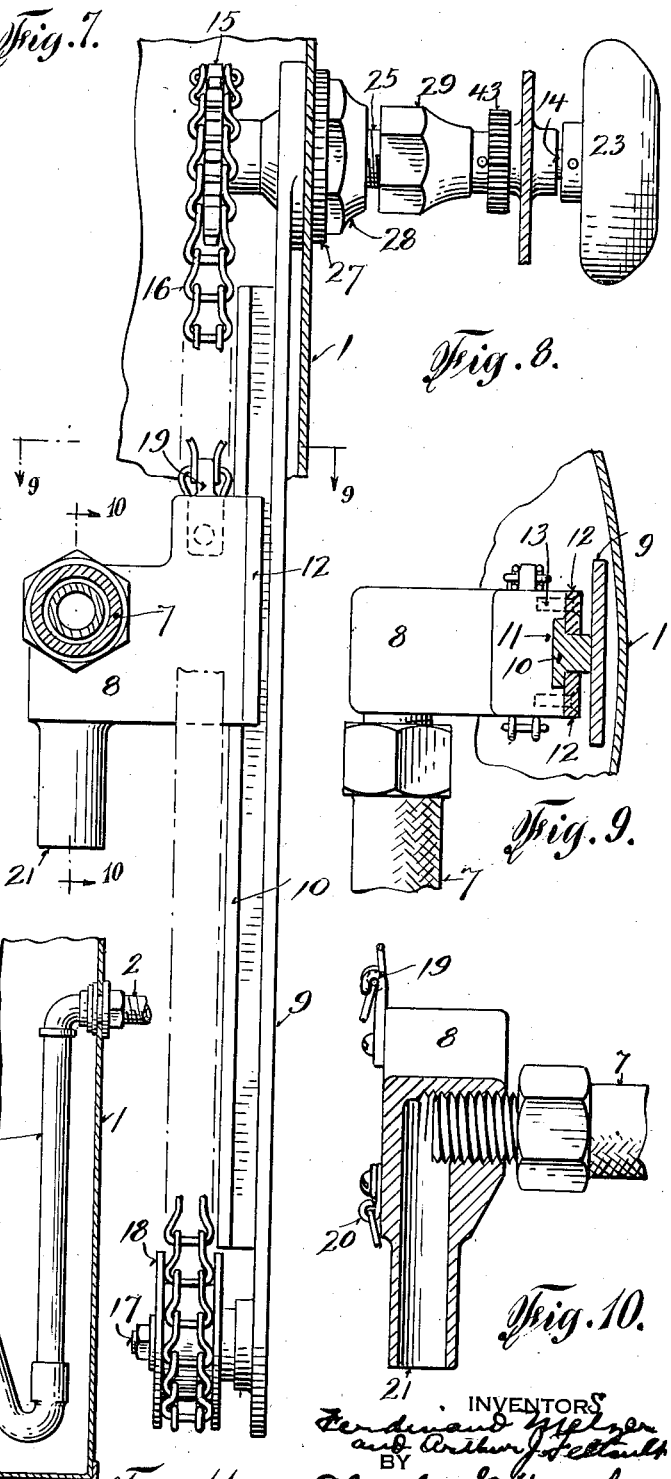

Patented Sept. 10, 1935

2,013,694

UNITED STATES PATENT OFFICE 2,013,694

MEANS FOR DELIVERING MEASURED QUANTITIES OF LIQUID FROM A RECEPTACLE

Ferdinand Melzer, Hollis, N. Y., and Arthur J. Feltault, Bloomfield, N. J., assignors to Per-Co-Mak Corporation, New York, N. Y., a corporation of New York Application July 20, 1933, Serial No. 681,314

6 Claims. (Cl. 221—95)

The present invention relates to a device for delivering measured quantities of liquid from a container. While there are other uses for our invention, we have chosen to illustrate the same in connection with coffee making apparatus to which we have applied our invention.

In coffee making apparatus, especially such as are used for making quantities of coffee and which are generally used in hotels, restaurants, and other places where coffee is dispensed in quantity, it is customary to provide a boiler in which water is heated to the boiling point and to supply the heated water from this boiler to one or more urns in which latter the coffee is brewed.

In order to be able to make coffee of uniform strength, it is necessary to control the proportions of coffee and water. It is easy to supply a definite quantity of coffee to the coffee urn but it has not been a simple matter to deliver a measured quantity of water from the boiler into the urn to accord with the amount of coffee supplied to the latter. At times it may be desirable to brew, say one gallon of coffee, and at other times it may be desired to brew a larger quantity, say several gallons. Various devices have been proposed for delivering measured quantities of water from the boiler to the urn but these have not been very satisfactory in their operation and uniform in results because it has been difficult to deliver in any given operation the exact quantity of water desired.

The present device permits any given quantity of water to be transferred from the boiler to the urn in any given operation, and the quantity of water transferred may be very accurately measured. This is accomplished in the present case with a very simple and positive device which is mechanical in its construction and avoids the necessity of using any electrical equipment. The present device also avoids the necessity of using a measuring chamber for the liquid, which is an advantage because with the elimination of the measuring chamber false measuring, due to vapors, is avoided.

The present device is simple, inexpensive, and it is positive in its operation. Other advantages will be set forth in the following detailed description of our invention.

In the drawings forming part of this application,

Figure 1 is an elevation of a water boiler partly broken away to show the interior and the connections with one or more coffee urns are illustrated in this view, Figure 2 is an elevation with part of the boiler broken away and illustrating how the discharge nozzle is lowered to deliver a definite quantity of liquid, Figure 3 is a sectional view taken on the line 3—3 of Figure 4, Figure 4 is an elevation of the gear device for operating the dial with parts of the housing broken away to show the interior parts, Figure 5 is a sectional view taken on the line 5—5 of Figure 1, Figure 6 is a sectional view taken on the line 6—6 of Figure 5, Figure 7 is an enlarged elevation of the nozzle and the chain for raising and lowering the same within the water boiler, Figure 8 is a sectional view showing in elevation the parts illustrated in Figure 7, Figure 9 is a sectional view taken on the line 9—9 of Figure 8, Figure 10 is a sectional view taken on the line 10—10 of Figure 8.

Figure 11 is a detailed sectional view of a modification of my invention.

In the drawings there is shown a water boiler 1 adapted to be heated by means of a gas flame or other heating means for the purpose of boiling the water contained within the boiler. Various quantities of boiling water are adapted to be transferred through the pipe 2 to the coffee urn 3, the details of which latter are not necessary to an understanding of the present invention.

The top of the boiler is closed by means of a cover 4 and there is a pipe 5 connected with the upper portion of the boiler and provided on its free end with an automatic pressure release valve 6 which operates to relieve pressure in the boiler when it reaches a certain point, say three-quarters of a pound pressure, which is about the pressure at which boilers of this type are usually operated. It will be apparent that normally there will be a pressure maintained in the boiler, once the water has started to boil, and this pressure is utilized to transfer the heated water from the boiler to the coffee urn.

The present invention relates to the means for causing a definite and predetermined amount of water to be transferred from the boiler to the urn. This device consists, preferably, of the following parts: To the outlet pipe 2 there is connected a flexible hose 7 and the other end of this hose is connected with a nozzle member 8 the connection being such as to permit the hose to turn in relation to the nozzle member.

There is mounted inside the boiler a vertical guide member 9 which is provided with a guide track 10 shown as T shape in cross section, to form a guide for the nozzle member. The nozzle member is provided with a slot 11 to receive the T shape head of the track member 10 therein and the two plates 12 which are secured to the nozzle member by the screws 13 engage the opposite sides of the T head 10 so that the nozzle member is slidable vertically along the track 10 and it is guided so that it is not allowed to move laterally. The engagement of the nozzle member with the track is a loose one, so that the nozzle member may move along the track member with very slight friction.

In order to provide means for moving the nozzle member vertically within the boiler, we have provided the following means: On the shaft 14 which extends through the wall of the boiler, there is provided on one end thereof a sprocket wheel 15 within the boiler over which travels an endless chain 16. Near the bottom of the supporting member 9 there is a stud shaft 17 on which is mounted a pulley 18 having flanges between which the lower loop of the chain is adapted to travel. The respective ends of the chain are connected at 19 and 20 to the nozzle member so that when the chain is operated, the nozzle member may be caused to move up or down along the track. It will be observed that the lower, open end 21 of the nozzle is adapted to receive the water in the boiler and this water is adapted to travel through the nozzle, thence through the flexible hose 7, thence through the pipe 2 and into the coffee urn 3.

The device thus far described operates as follows: When the boiler is filled, say to the top of the gauge glass 22, the nozzle will be in the upper or starting position within the boiler, being held there by the chain and sprocket device.

Assuming that it is desired to transfer a given quantity of water from the boiler to the urn, the operator will turn the handle 23 thereby revolving the shaft 14 and lowering the nozzle member below the then upper level of the water. The diameter of the boiler being known, the nozzle will be lowered a definite distance for the transfer of a predetermined amount of water. Let us assume that for each inch in depth of the boiler a gallon of water is contained; then for every inch the nozzle is lowered, a gallon of water will be transferred. Let it be assumed that the nozzle is lowered one inch below the top level of the water by the operation of the knob 23. The valve 24 is then opened and the pressure of the vapor above the water in the boiler will be sufficient to cause the water to rise in the nozzle, pass through the flexible hose 7, through the pipe 2, and into the urn 3. When this water has been transferred to a point where the level of the water in the boiler is lowered to the lower end 21 of the nozzle, no more water can be transferred regardless of what the pressure might be in the vapor space in the boiler above the water. A definite and predetermined amount of water will have been transferred from the boiler to the urn. When the water has been consumed in the urn or for any other reason it is desired to transfer another quantity of water to it, the above operations will be repeated; that is to say, the handle 23 will be operated to move the sprocket 15 and thereby move the chain, so that the lower end of the nozzle is projected below the then top level of the water in the boiler; and the extent of this lowering operation will depend upon the quantity of water to be transferred from the boiler to the urn. Let it be assumed that one gallon of water is to be transferred then in the example stated above, the nozzle will be lowered one inch below the top surface of the water in the boiler and it will be allowed to stand at this level.

The valve 24 will then be opened a second time and the water will be transferred by the pressure through the nozzle and the flexible hose and the pipe 2 to the urn. The flow will cease immediately when the level of the water in the boiler reaches the bottom end of the nozzle.

In like manner, the nozzle may be lowered a greater distance below the existing top level in the boiler in order to deliver a relatively larger quantity of water from the boiler to the urn.

Inasmuch as the measuring device is inside the urn and is therefore not visible, it is preferable to have some means exterior of the boiler to indicate where the lower end of the nozzle is located from time to time and this device may be calibrated to determine the amount of water to be transferred at any given operation. For this purpose we have shown the following device: The shaft 14 on which the operating knob 23 is mounted and on which the sprocket 15 is mounted, extends through a sleeve 25 which has a head 26 engaging against the inner surface of the upper end of the supporting member 9, it being understood that the shaft and the sleeve both pass through the wall of the boiler and through an aperture in the upper end of the support 9. On the outside of the wall of the boiler there is a rubber gasket 27 pressed against the outer surface of this wall by means of a nut 28 which is threaded onto the threaded end of the sleeve 25. The head 26 of the sleeve and the nut 28 therefore press the support 9, the wall of the boiler and the gasket 27 together and form a liquid-tight mounting to secure these several parts on the wall of the boiler.

There is another nut 29 threaded onto the threaded end of the sleeve 25 and between the flange of this nut and the end of the sleeve there is a compressible packing 30 which is pressed against the shaft 14 when the nut is screwed down, to form a stuffing box for the purpose of preventing liquid and vapor passing out along the shaft.

There is a boss 31 projecting from the wall of the boiler and there is attached to this a housing 32 for enclosing the gears which operate the indicator. There is shown mounted above the operating knob 23 a pointer 33 mounted on a short shaft 34 having its bearing in a boss of the housing; and this pointer co-operates with the dial 35 arranged on the face of the housing. When the device is not limited to any given proportions by way of illustrating the operation of the invention, it may be assumed that the capacity of the boiler is fifteen gallons, and that in each vertical inch in the height of the boiler there is contained one gallon of water. It may be assumed under these conditions that the range of vertical movement of the nozzle member is fifteen inches. In such case the dial 35 will be divided off into fifteen sub-divisions, each representing one gallon of water and one inch of movement of the nozzle member.

On the same shaft 34 with the pointer 33 there is a gear 36 which is operated by a small pinion 37 on the shaft 38 which is also mounted in the housing. On the same shaft 38 on which the pinion 37 is mounted there is a large gear 39 and this meshes with a small pinion 40 mounted on the shaft 41. On the same shaft 41 there is also fixed a large gear 42 and this meshes with the small pinion 43 mounted on the shaft 14 which is operated by the knob 23. There is thus formed a chain of gears and the ratio is preferably such that for each complete revolution in the operating knob 23 the pointer 33 will be moved a distance equal to one division of the scale 35 or in other words, in fifteen complete revolutions of the knob 23 in the embodiment referred to, there will be a rise or fall of fifteen inches of the nozzle member.

When the boiler is filled to the top level at the start of the operation of the device, the nozzle 8 will be placed with its lower end 21 level with the surface of the water and the pointer 33 will be at zero on the scale. If one gallon of water is to be transferred from the boiler to the urn, the knob 23 will be revolved one revolution and this will operate through the sprocket and chain device to lower the nozzle one inch and this will bring the pointer 33 to the first mark at the right of zero in Figure 1. The valve 24 will then be opened and one gallon of liquid will be transferred from the boiler to the urn, the operation stopping automatically when the water level in the boiler reaches the lower end of the nozzle. In a later operation, if it is desired to transfer say two gallons of water, the operator will note that the pointer is at No. 1 on the dial and he will then turn the knob two revolutions to bring the pointer to No. 3 on the dial. On opening the valve 24 two gallons of water will be transferred from the boiler to the urn. These operations will be repeated from time to time until all of the water in the boiler has been transferred in which event the pointer will have made a complete movement around the dial. Of course, if the operator does not wish to allow the water to get very low in the boiler the supply to the boiler may be replenished before the boiler is completely empty, in which event the knob 23 will be reversed and turned until the lower end of the nozzle is at the top surface of the water in the boiler. From then on, the operations will be the same as previously described. At all times the operator will know by the position of the pointer in relation to the dial where the lower end of the nozzle is within the boiler.

It is customary to attach to the end of the pipe 2 within the boiler a pipe leading downwardly to a point near the bottom of the boiler in order to be able to draw off water until the level reaches nearly the bottom of the boiler. In instances where the boiler is equipped with such a pipe the hose may be connected with the bottom end of this draw-off pipe. In Figure 11 I have shown how the present device may be modified. In this view the pipe 45 is connected inside the boiler with one end of the pipe 2 and the pipe 45 extends downwardly to a point near the bottom of the boiler and ordinarily this lower end is open to receive the water which is to be transferred to the urn. In this modified construction the hose 49 is connected at one end with the bottom end of the pipe 45 and the upper end of the hose is connected with the travelling nozzle 8. Otherwise the construction is the same as first described. The pipe 45 acts as if it were a part of the hose.

The word "nozzle" is used in a broad sense and it is not limited to a member constructed separate from the hose unless otherwise specified or in other words, the end of the hose may constitute a nozzle.

From the above, it will be apparent that we have provided a very simple and positive device for transferring measured quantities of liquid from one receptacle to another without having to run the liquid into and out of a measuring chamber. In other words, there is a direct flow from the boiler to the urn. The quantity transferred must correspond with the adjustment of the nozzle because as soon as the surface of the water is lowered to the lower end of the nozzle, no more water can enter the nozzle and therefore the flow is definitely cut off according to the adjustment of the nozzle.

Having described our invention, what we claim is:

1. A device for transferring measured quantities of liquid from one receptacle to another, including a receptacle to which the liquid is supplied, a liquid conducting member adapted to deliver the liquid from said receptacle, a nozzle at the free end of said conducting member, a track mounted in said receptacle, with which said nozzle engages and is guided to move in a vertical path, and means for raising and lowering said nozzle on said track to position the nozzle at different horizontal levels within said receptacle, including revolvable members arranged in the upper and lower portions of said receptacle, and an endless member engaging over said revolvable members and connected with said nozzle, whereby the operation of said flexible member will raise and lower said nozzle along said track.

2. A device for transferring measured quantities of liquid from one receptacle to another, including a receptacle to which the liquid is supplied, a liquid conducting member adapted to deliver the liquid from said receptacle, a nozzle on the free end of said conducting member, a track mounted in said receptacle, with which said nozzle engages and by which it is guided to move in a vertical path, and means for raising and lowering said nozzle on said track to position the nozzle at different horizontal levels within said receptacle, including revolvable members arranged in the upper and lower portions of said receptacle, and an endless member engaging over said revolvable members and connected with said nozzle whereby the operation of said flexible member will raise and lower said nozzle along said track, and means operable from outside the receptacle for operating said revolvable members and said flexible member to raise and lower the nozzle.

3. A device for transferring measured quantities of liquid from a receptacle, including a receptacle to which the liquid is supplied, a liquid conducting member adapted to deliver liquid from the upper portion of said receptacle, a guide member mounted within the receptacle and having a track, a nozzle on said liquid conducting member having means for engaging the track to be guided to move vertically thereby, a shaft extending through the wall of said receptacle and having means exterior of the receptacle for operating said shaft, a sprocket wheel mounted on said shaft within said receptacle, a pulley adjacent the lower portion of said receptacle, a chain engaging over said sprocket and said pulley and connected with said nozzle whereby the operation of said shaft will cause the nozzle to be raised and lowered along said track.

4. A device for transferring measured quantities of liquid from a receptacle, including a receptacle to which liquid is supplied, a flexible hose for conducting liquid from said receptacle, a nozzle connected with the free end of said hose, means for guiding said nozzle to move vertically in said receptacle, a shaft extending through the wall of the receptacle and provided with means outside the receptacle for operating the shaft, a sprocket on said shaft within the receptacle, a pulley adjacent the lower portion of the receptacle, a chain looped around said sprocket and around said pulley and connected with said nozzle whereby the operation of said shaft will cause the nozzle to be raised and lowered within the receptacle.

5. A device for transferring measured quantities of liquid from a receptacle, including a receptacle, a flexible liquid conducting member having a nozzle on the free end thereof, a guiding member adapted to be mounted inside the wall of said receptacle and provided with means for guiding said nozzle to move in a vertical path in said receptacle, a shaft extending through the upper portion of said guiding member and through the wall of said receptacle, a sprocket mounted on said shaft and disposed within the receptacle, a pulley mounted on the lower end of said guiding member, a chain engaging around said sprocket and around said pulley and connected with said nozzle, whereby the operation of said shaft will cause the nozzle to be raised and lowered along said guiding member.

6. A device for transferring measured quantities of liquid from a receptacle, including a receptacle, a flexible liquid conducting member for delivering liquid from said receptacle, said conducting member having a nozzle on one end thereof, means in said receptacle for raising and lowering the nozzle, a shaft extending through the receptacle for operating said nozzle raising and lowering device, a scale, a pointer co-operating with said scale, a chain of reducing gears connecting said shaft and said pointer for causing said pointer to be moved one unit position on said dial for each revolution of said shaft, whereby said pointer will indicate the position of said nozzle within said receptacle.

FERDINAND MELZER.
ARTHUR J. FELTAULT.